UNITED STATES PATENT OFFICE.

GEORGE HALE BRABROOK, OF TAUNTON, MASSACHUSETTS.

PROCESS OF COATING OR FACING MOLDS.

972,325.　　　Specification of Letters Patent.　　Patented Oct. 11, 1910.

No Drawing.　　Application filed November 9, 1904.　Serial No. 232,059.

*To all whom it may concern:*

Be it known that I, GEORGE HALE BRABROOK, a citizen of the United States, residing at Taunton, in the county of Bristol, State of Massachusetts, have invented a certain new and useful Improvement in Processes of Coating or Facing Molds, of which the following is a specification.

In the production of high grade castings by the well known sand molding process, the pattern after being properly bedded in the sand is withdrawn therefrom and the mold is "faced." This is usually accomplished by sprinkling or spraying the sand mold lightly with water and then shaking upon it through a cloth bag the facing material, which may be French burnt molding sand, tripolite, or other well known material commonly employed for this purpose. The pattern is then replaced in the mold and the mold rammed. When a fine sharp casting is required this facing process is repeated, since a single facing of the mold will result in a relatively rough casting. Since, however, the facing material is applied dry only a little of it will adhere to the mold at a time, and if this facing process is repeated a number of times there is increasing danger of injuring or impairing the mold, since the high portions of the ornamentation of the mold become comparatively dry and tend to break away or stick in the deep hollows of the pattern.

It will be noted that the proper facing of the mold is a highly important part of the work of producing a casting and that as the quality, fineness and high grade of the casting increases the time and skill required in performing the facing operation increases in greater ratio. It not infrequently happens in my experience that in properly preparing the mold from which a flower or fruit design of average character is to be made one-half to two-thirds of the whole time required is devoted to the proper facing of the mold and this is true of the most skilled of the workmen employed.

The object of my invention now to be described is to provide an improved method or process of facing porous non-metallic molds by the employment of which the mold may be more perfectly prepared or finished by less skilled labor, while a great saving in the time required is effected.

In practicing my improved method or process of facing the mold I proceed as follows—after the pattern has been withdrawn the mold is preferably lightly sprayed with water to slightly moisten the surface. This may be unnecessary if the sand is sufficiently moist. I then apply a mixture of any well known facing material, German or French burnt sand, for example and some volatile liquid, such as benzin ┼the said facing material and liquid are preferably mixed in the proportions of one-third of a pint of facing material to one pint of volatile liquid. The facing material is held in suspension in the liquid and the proportions may be varied so long as the resulting mixture is such that it can be sprayed or otherwise uniformly applied to the mold to effect the deposit upon the surface thereof of a substantially uniform layer of the facing material. The facing material thus applied forms a pasty or plastic layer or skin on the surfaces of the mold.

After the above mixture has been thus applied and before the volatile liquid has had an opportunity to evaporate entirely the pattern is replaced in the mold and the mold rammed. The pattern is then removed and the surface of the mold will be found to present a very detailed clear sharply-defined copy of the pattern. The mold may then be sprayed with oil to hold the facing in place if the mold is to be baked in the usual way. Of course other volatile liquids may be employed instead of benzin. I prefer benzin chiefly because of its cheapness. The benzin may be modified to cause it to evaporate more slowly, should that be desired, or it may be rendered non-inflammable by the admixture of a proper proportion of tetrachlorid of carbon. As will be obvious the volatile liquid used must be such as will not attack the surfaces of the patterns employed.

A great advantage resulting from the employment of my process and which I have not heretofore referred to, is to be found in the saving of facing material. My experience has been that a very large percentage of this material is lost when it is shaken onto the molds while by my process hereinabove described the loss is reduced to a minimum and where ordinary care is used is practically nothing.

As will be clear the essential of my invention is the coating of the mold surfaces with a layer more or less plastic or pasty (or of putty-like consistency) the liquid element of which is volatile and which will consequently quickly increase in hardness as the liquid evaporates. This layer is of such a character that when the pattern is replaced and put home in the mold by proper ramming the finest details of the pattern will be sharply taken, while the plain surfaces will be represented in the mold by corresponding finely polished smooth surfaces. I do not therefore desire to limit myself to a specified way of producing this layer in the mold for this will depend in part upon the kind of patterns employed, the kind of material used in making the molds, and the character, quality etc. of the work to be produced.

I likewise contemplate forming the plastic or pasty layer of facing material and volatile liquid upon the pattern itself, from the surface of which it is transferred to the mold when the latter is formed around the pattern. This may be accomplished by spraying the mixture of facing material and volatile liquid upon the pattern, or the pattern may be covered with the volatile liquid by brushing or painting the liquid upon it after which the facing material may be sifted or evenly deposited upon the surface of the pattern in any well known manner, thus mixing on the pattern with the volatile liquid and forming a plastic or pasty layer. The pattern thus coated is properly bedded in the molding sand and the mold thus formed will have upon its surfaces the facing material which was originally deposited upon the pattern. A superior mold may thus be produced with comparatively unskilled labor and at a saving of expense for time and material.

My process also renders possible the employment of rough surfaced molds, such as might be made from clay, porous when baked and too rough in themselves to cast from. These may be faced in accordance with my process and while requiring to be refaced each time they are used, they may be repeatedly used and the forming of a mold each time by the process of ramming etc. being thus eliminated. I refer to these applications of my invention in order to make more clear the scope thereof, but not with a view to specifying all the various conditions under which it may be advantageously employed.

What I claim is:

1. The process of facing molds which consists in applying intermediate the mold and the pattern a layer composed of facing material mixed with a volatile liquid and while the facing material is still permeated by the volatile liquid applying pressure to force the facing layer into intimate contact with the pattern.

2. The process of facing sand molds which consists in applying thereto a mixture of facing material and a volatile liquid under pressure then spraying the facing with oil and then drying the mold.

3. The herein described process of forming molds consisting of forming the body of the mold out of moist molding sand upon a pattern, then withdrawing the pattern and applying intermediate the pattern and the mold a layer of facing material mixed with a volatile liquid, then replacing the pattern and applying pressure to force the facing layer into intimate contact with the mold while the facing material is still permeated with the volatile liquid.

In testimony whereof I affix my signature in presence of two witnesses.

GEORGE HALE BRABROOK.

Witnesses:
 WM. A. MACLEOD,
 ALICE H. MORRISON.